Jan. 31, 1950  A. STARTS  2,495,784
VALVE CONTROL FOR CRANKCASE COMPRESSION ENGINES
Filed Nov. 21, 1945  3 Sheets-Sheet 1

INVENTOR.
ALBERT STARTS
BY Richey & Watts
ATTORNEYS

INVENTOR.
ALBERT STARTS
BY Richey & Watts
ATTORNEYS

Jan. 31, 1950          A. STARTS          2,495,784
VALVE CONTROL FOR CRANKCASE COMPRESSION ENGINES
Filed Nov. 21, 1945          3 Sheets-Sheet 3

INVENTOR.
ALBERT STARTS
BY
ATTORNEYS

Patented Jan. 31, 1950

2,495,784

UNITED STATES PATENT OFFICE 2,495,784

VALVE CONTROL FOR CRANKCASE COMPRESSION ENGINES

Albert Starts, Fort Lauderdale, Fla., assignor to Duncan Parking Meter Corporation, a corporation of Illinois Application November 21, 1945, Serial No. 629,951

9 Claims. (Cl. 123—73)

This invention relates broadly to internal combustion engines and more specifically to improvements in engines of the two-stroke cycle type.

One of the objects of the invention is to provide passageways in an engine for conducting the fuel mixture in heat exchange relation through the crank case, crank shaft and block to the combustion chamber.

Another object of the invention is to provide a structure in which a predetermined volume of the burnt products of combustion are entrapped in the cylinder and admixed with the incoming fuel charge for the purpose of lowering the flame temperature in the combustion chamber and thus eliminating detonation.

Another object of the invention resides in an improved and novel construction of the crank shaft and valve actuating mechanism associated therewith.

Another object of the invention is to provide a fuel intake valve which is designed to meter the volume of the fuel charge without impeding the velocity thereof.

Another object of the invention is to provide an engine crankcase which is proportioned relative the piston displacement to effect a uniform pressure rise of the fuel mixture within the crankcase and passageways associated therewith.

Further objects of the invention reside in provisions of an engine which is economic of operation, durable of structure and capable of high power output relative to its weight.

Other objects and advantages more or less ancillary to the foregoing and the manner in which all the various objects are realized will appear in the following description, which considered in connection with the accompanying drawings, sets forth the preferred embodiment of the invention.

Referring to the drawings.

Figure 1:
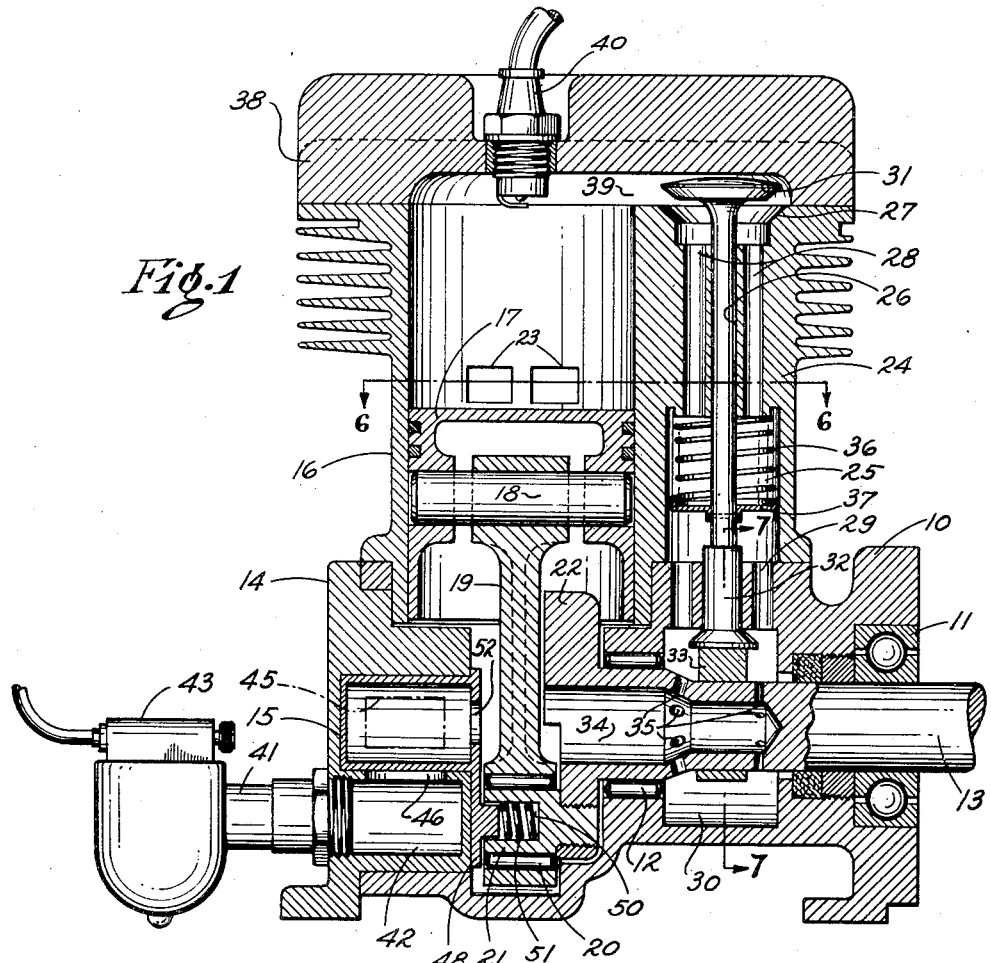
Fig. 1 is a vertical longitudinal section through the improved engine.
Figure 6:
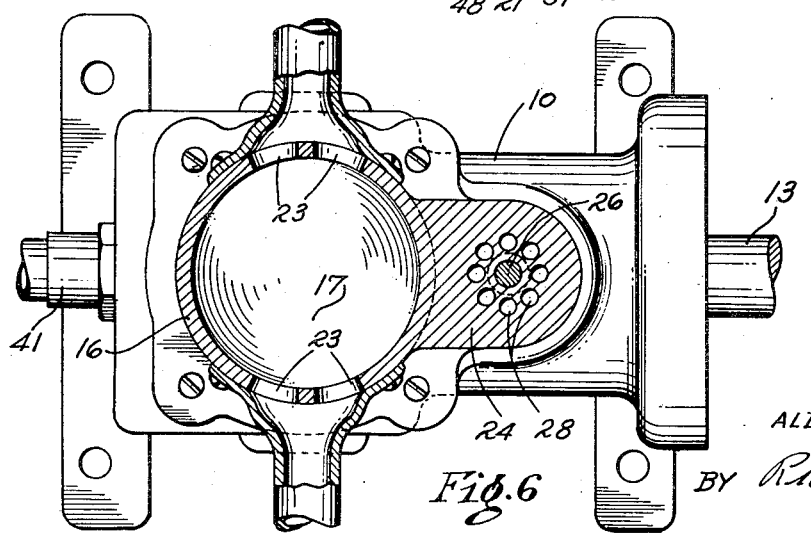
Fig. 6 is a horizontal section through the engine, the section being taken on a plane indicated by the line 6—6 in Fig. 1.
Figure 2:
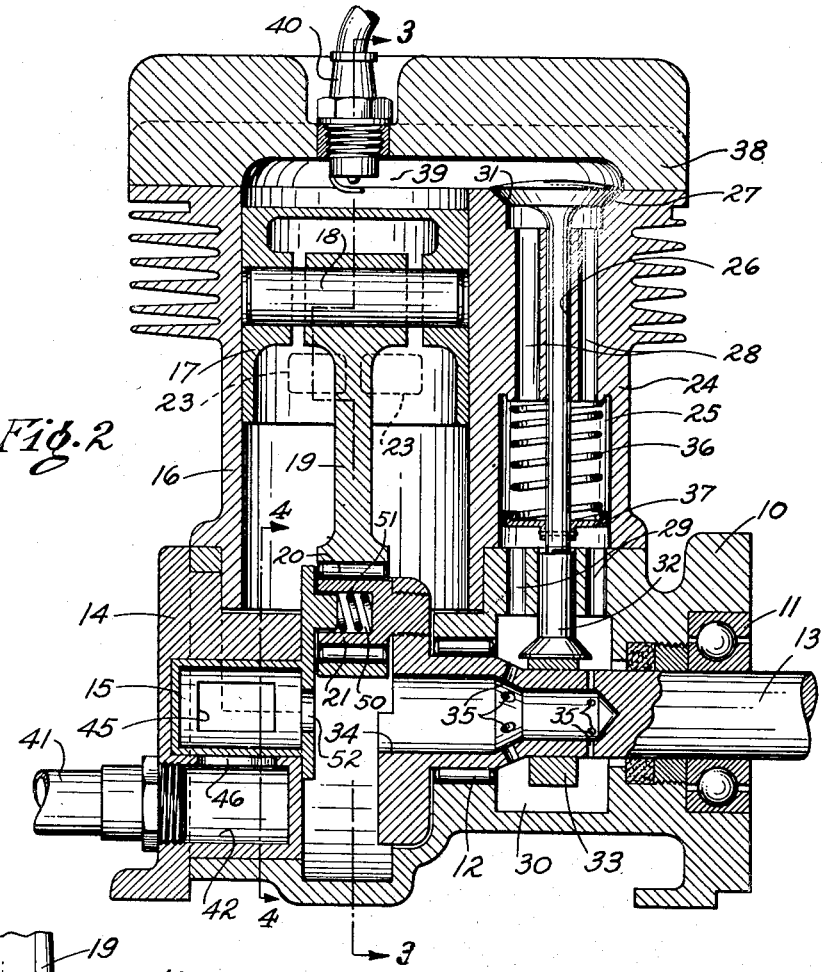
Fig. 2 is a vertical section through the engine similar to Fig. 1, the piston being shown in its upper position.
Figure 4:
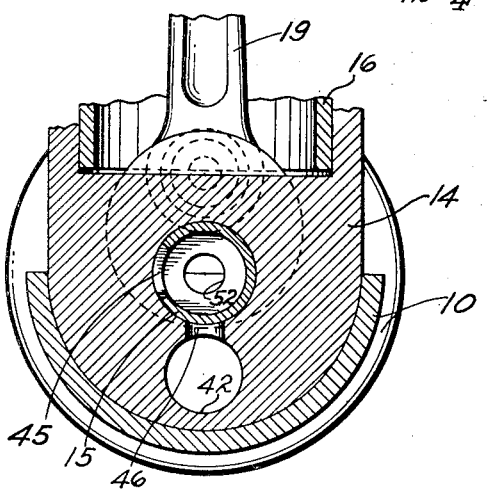
Fig. 4 is a vertical sectional view through the fuel intake chamber, the section being taken on a plane indicated by the line 4—4 in Fig. 2.
Figure 3:
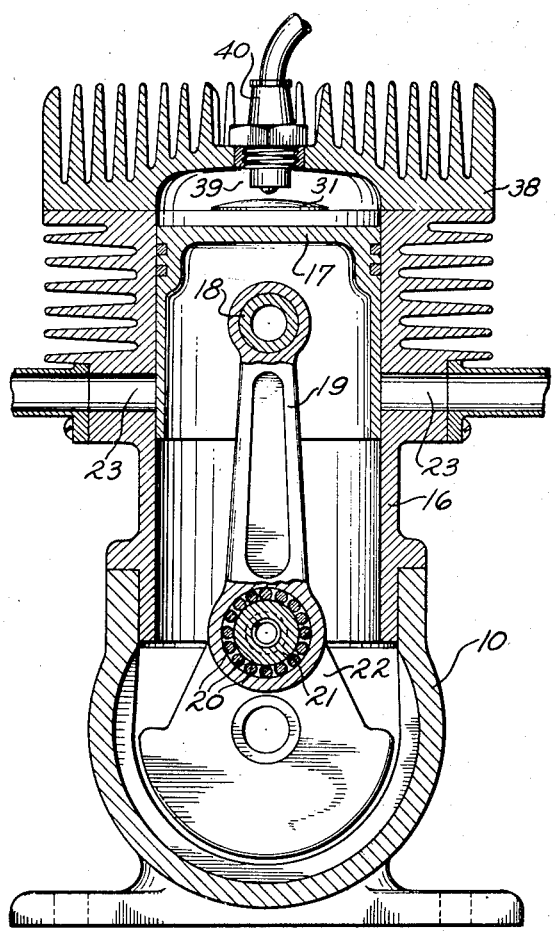
Fig. 3 is a transverse sectional view through the engine, the section being taken on a plane indicated by the line 3—3 in Fig. 2.
Figure 7:
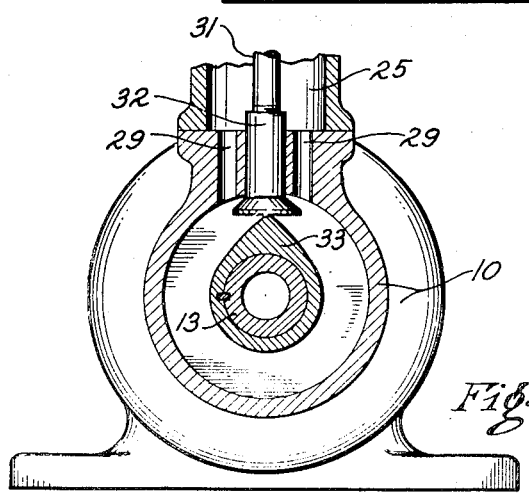
Fig. 7 is a transverse sectional view through a portion of the crankcase, the section being taken on a plane indicated by the line 7—7 in Fig. 1.

Referring first to Fig. 1, the engine embodies a crankcase 10, bored for the reception of antifriction bearings 11 and 12 for the support of a crank shaft 13 and a cap or end plate 14 disposed in aligned relation with the medial axis of the crank shaft 13 and machined for the reception of a fuel intake valve 15. The upper face of the crankcase is formed to receive a cylinder block 16 provided with a piston 17 formed in the customary manner with a wrist pin 18 for the support of a connecting rod 19 mounted on antifriction bearings 20 on a crank pin 21 secured in the arm 22 (Fig. 3) of the crank shaft 13. The cylinder 16 is provided with exhaust ports 23 disposed for communication with atmosphere when the piston 17 is in its lowered position i. e. the bottom dead center of the crank arm 22. The skirt of the piston is constructed to overlie the ports 23 when the crank arm 22 is in top dead center. The cylinder block is further provided with a valve cage 24, formed as an integral part thereof, which comprises a fuel chamber 25, a bore 26 constituting a valve stem guide, a valve seat and a series of vertical openings 28 arranged in circumbient relation with the valve stem guide and disposed in aligned relation with similar apertures 29 communicating with the chamber 25 and a pocket 30 in crank case 10. A poppet valve 31 of conventional form, is mounted in the bore 26, the head thereof being formed for engagement upon the valve seat 27. The lower end of the valve stem is provided with a shoe 32 engaged with a cam 33 (Fig. 7) keyed or otherwise secured upon the crank shaft 13. The inner end of the crank shaft is formed with a longitudinal bore 34 having radial openings 35 therein which communicate with the passageway or pocket 30 in the crank case. The valve 31 is urged in seated relation with the valve seat 27 by a helical spring 36 impinged between the upper wall of the chamber 25 and a spring cup 37 on a pin mounted in the stem of the valve 25. The upper face of the cylinder block is machined for the reception of a cylinder head 38 having an offset combustion chamber 39 therein and formed for the reception of a spark plug 40. The spark plug is disposed in aligned relation with vertical axis of the cylinder 16 and is preferably positioned so that the points thereof will lie in a horizontal plane passing through the central portion of the combustion chamber.

Figure 5:
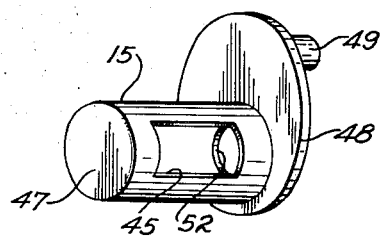
Fig. 5 is a view in perspective of the fuel intake sleeve valve.

The cap 14 in the crankcase is drilled and tapped for the reception of a conduit 41 communicating with a fuel chamber 42 and a carburetor 43. The cap is further bored for the reception of the sleeve valve 15 having an opening 45 in the side wall thereof which is arranged for registration with a port 46 in the wall defining the chamber 42. The sleeve valve 15 comprises a tubular body formed with a closed end wall 47 (Fig. 5) and a disc 48 on the opposed end thereof. The disc is constructed with a central opening therein and is provided with a crank arm 49 disposed for engagement within a recess 50 in the crank pin 21. The disc 48 is normal to the medial axis of the tubular body of the sleeve and is held in spring pressed engagement with the inner face of the cap 14 by a helical spring 51 mounted in the recess 50 in the crank pin 12.

In operation, the opening 45 in the valve 15 and the port 46 are brought into registration during the upward movement of the piston thus causing the fuel mixture from the carburetor to be injected into the chamber 42 from where it is drawn through the opening 52 in the disc 48 and into the interior of the crankcase 10. As the piston descends the valve 15 is closed and the fuel mixture is introduced into the crankcase where it is compressed and driven through the openings 34 and 35 in the crank shaft, through the pocket or passageway 30 through the openings 29, the chamber 25 and openings 28, and upon actuation of the poppet valve 26, flows into the combustion chamber 39.

When the piston, during its downward movement reaches a point substantially 60° ahead of bottom dead center of the crank pin, the exhaust ports 23 will be uncovered thus causing a rapid fall of pressure in the combustion chamber 39. When pressure in the combustion chamber becomes slightly less than pressure of the fuel mixture in the chamber 25, the interior of the crankcase and other inter-communicating passageways, the valve 26 will be opened by the cam 33 which is preferably positioned to effect such opening at about 40° before bottom dead center of the crank pin 21. Such movement of the valve will release the compressed and expanded fuel charge and permit the flow thereof into the combustion chamber 39. Introduction of the fuel into the crankcase tends to lower the temperature thereof and increase the expansion of the fuel thus elevating the compressive ratio in the motor. Since the engine is of the two-stroke cycle type, a certain amount of the unburnt products of combustion will remain in the cylinder after the piston reaches bottom dead center of the crank pin, hence during the upward stroke of the piston such exhaust gas or $CO_2$ as remains in the cylinder will be commingled with the fresh fuel introduced through the valve 26 thereby reducing the flame temperature in the combustion chamber 39 which in turn eliminates detonation. When using fuel of the lower octane content, the cam 33 may be positioned to effect the retention of a larger amount of the burnt products of combustion within the cylinder. The lubricant is preferably introduced into the crankcase during operation of the engine in such volume and in such a manner as to effect complete atomization and admixture thereof with the fuel injected through the valve 15.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim is:

1. An internal combustion engine comprising a crankcase having fuel mixture passageways therein, a cylinder block mounted on said crankcase having exhaust ports in the side wall thereof and fuel mixture passageways in the base thereof communicating with the passageways in the crankcase, a cylinder head on said block having a combustion chamber therein, a poppet valve in said block subjacent said combustion chamber, a crank shaft in said crankcase having a passageway therein communicating with the interior of said crankcase at one end and the fuel passageways therein at the other end, a crank arm on said crank shaft, a connecting rod thereon, a piston in said cylinder block coupled with said connecting rod, said crank arm being arranged to retract said piston below said exhaust ports when the arm is disposed in its bottom dead center position, a cam on said crank shaft engaged with said poppet valve, a carburetor coupled in fluid communication with the interior of said crankcase, a rotary valve intermediate said carburetor and said crankcase and means on said valve operatively engaged with said crank shaft for rotating said valve.

2. An internal combustion engine comprising a crankcase, a cylinder block thereon having exhaust ports therein and a cylinder head on said block having a combustion chamber therein, an inlet valve in said block subjacent said combustion chamber, a crank shaft in said crankcase, a connecting rod thereon, a piston in said cylinder block coupled with said connecting rod, a passageway for conducting fluid into the crankcase, a rotary valve in said crankcase for the control of the fuel mixture injected into said crankcase, a passageway in the crank shaft for conducting fluid from the crankcase to said inlet valve, a cam on said crank shaft for lifting the inlet valve and a crank coupled with the crank shaft for rotating the rotary valve.

3. An internal combustion engine comprising a crankcase having fuel inlet and outlet passageways therein, a cylinder block having fuel exhaust ports and passageways therein, a cylinder head having a combustion chamber thereon in fluid communication with the fuel passageway in said block, a crank shaft having passageways therein communicating with the crankcase and passageways in the block, a poppet valve in the block operatively connected with said crank shaft, a connecting rod on said crankshaft, a piston in said cylinder coupled with said connecting rod, an intake valve in said crankcase and a crank coupled with said valve and said crank shaft for effecting the rotation thereof.

4. An internal combustion engine comprising a crankcase, a cylinder block thereon and a cylinder head on said block having a combustion chamber therein, said crankcase and cylinder block having fuel passageways therein, a crank shaft in said crankcase having a fuel passageway therein communicating with the passageways in the crankcase and cylinder block and with the crankcase, a connecting rod on said crank shaft, a piston in said cylinder block coupled with said connecting rod, a poppet valve in said block adjacent said combustion chamber, means on said crank shaft for actuating said poppet valve, a rotary sleeve intake valve in said crankcase communicating with a source of vaporized fuel and means connected with said crank shaft for rotating said rotary sleeve valve.

5. An internal combustion engine comprising a crankcase, a cylinder block thereon, a cylinder head having a combustion chamber therein, said cylinder block having a fuel passageway therein communicating with said combustion chamber, a valve in said passageway, a valve stem thereon protruding into said crankcase, a spring about said valve stem normally urging the valve head in its seated position, said crankcase having a series of openings constituting fuel passageways circumbient said valve stem, a crank shaft having fluid passageways therein communicating with the passageways in said crankcase and with said crankcase, a cam on said crank shaft engaged with said valve stem, a connecting rod on said crank shaft, a piston in said cylinder block coupled with said connecting rod and a fuel intake valve in said crankcase communicating with the fuel passageway in said crankcase and a carburetor connected with said fuel intake valve.

6. An internal combustion engine comprising a crankcase, a cylinder block thereon, a cylinder head on the cylinder block, a crank shaft in said crankcase, a connecting rod therein, a piston in said cylinder block coupled with said connecting rod, a carburetor mounted on said crankcase, a conduit coupled with the carburetor and mounted in said crankcase, a rotary intake valve in said crankcase in fluid communication with said conduit, a disc on said valve, a pin therein operatively engaged with the crank shaft, a spring in said crank shaft urging said disc in abutting relation with the portion of the wall of the crankcase surrounding said valve, said cylinder block, crankcase, crank shaft and cylinder block having fuel passageways therein communicating with said valve.

7. In an internal combustion engine comprising a crankcase, a piston and cylinder assembly, a crank, a connecting rod associated with the crank and piston, an inlet valve, an inlet passageway surrounding said valve, a cam on the crank shaft for operating the valve, a bearing for the crank shaft located between the said cam and the crankcase and passageway, and means in the crank shaft communicating with said inlet passageway whereby the mixture drawn into the engine cools and lubricates the valve.

8. In an internal combustion engine comprising a crankcase, a piston and cylinder assembly, a crank, a connecting rod associated with the crank and piston, means to admit fluid to the crankcase, an inlet valve, an inlet passageway entirely surrounding said valve, a cam on the crank shaft for operating said valve, said crankcase being chambered to house the cam, a passageway between said chamber and said inlet passageway, a bearing for the crank shaft located between the said cam and the portion of the crankcase that houses the crank, and passageway means in the crank shaft communicating with the crankcase and with said chamber whereby the mixture drawn into the crankcase cools and lubricates the valve and cam.

9. An internal combustion engine comprising a crankcase, a cylinder block thereon, a cylinder head on said block having a combustion chamber therein, said cylinder block having fuel passageways therein, a crank shaft in said crankcase having a fuel passageway therein communicating with the passageways in the cylinder block and the crankcase, a connecting rod on said crank shaft, a piston in said cylinder block coupled with said connecting rod, a poppet valve in said block adjacent said combustion chamber, a cam on said crank shaft for actuating said poppet valve, said crankcase having an opening in a wall thereof disposed in aligned relation with the axis of the crank shaft, a plate in said opening having a fuel inlet port therein, a rotary sleeve valve in said plate having an aperture therein communicating with said port and a second opening communicating with said crankcase, and a crank pin on said rotary sleeve valve operatively connected with the crank shaft for driving said rotary sleeve valve.

ALBERT STARTS.

REFERENCES CITED

The following references are of record in the file of this patent:

UNITED STATES PATENTS

| Number | Name | Date |
|---|---|---|
| 659,944 | Weed | Oct. 16, 1900 |
| 1,091,963 | Riedl | Mar. 31, 1914 |
| 1,445,319 | Jel | Feb. 13, 1923 |
| 1,490,305 | Andrews | Apr. 15, 1924 |
| 1,554,618 | Barton | Sept. 22, 1925 |
| 1,610,846 | Campbell | Dec. 14, 1926 |
| 2,391,380 | Barker | Dec. 25, 1945 |

FOREIGN PATENTS

| Number | Country | Date |
|---|---|---|
| 162,464 | Great Britain | 1921 |
| 524,268 | France | 1921 |
| 602,432 | France | 1926 |